METHOD OF PRODUCING CAVITIES IN SEMICONDUCTIVE SURFACES

Filed May 24, 1954

INVENTOR
M. B. PRINCE
BY David H. Wilson, Jr.
ATTORNEY

United States Patent Office 2,844,531

Patented July 22, 1958

2,844,531

METHOD OF PRODUCING CAVITIES IN SEMICONDUCTIVE SURFACES

Morton B. Prince, New Providence, N. J., assignor to Bell Telephone Laboratories, Incorporated, New York, N. Y., a corporation of New York Application May 24, 1954, Serial No. 431,867

13 Claims. (Cl. 204—143)

This invention relates to methods and an apparatus for the localized etching of bodies formed of electrical conductors and particularly semiconductive bodies as employed in electrical translating devices.

Recently several forms of electrical translating devices have been evolved wherein semiconductive bodies having other than plane surfaces have been required. These devices are exemplified by the dimple type of transistor disclosed in Patent 2,560,579 which issued July 17, 1951, to W. E. Kock and R. L. Wallace, Jr., the field controlled translator disclosed in W. Shockley's application Serial No. 243,541 of August 24, 1951, now Patent No. 2,744,970, and the alloy type transistors formed from semiconductive bodies having thin webs, preferably having parallel plane surface portions, of only a few mils or less thickness. Heretofore, the depressions in the major surfaces of semiconductive bodies of the above type have been produced by abrading techniques which disrupt the crystal structure and require a subsequent etching operation to expose an undisturbed crystal structure of the quality required. Further, the mechanical techniques for the removal of material result in a substantial loss due to destricution of blanks.

In view of the above, one object of the present invention is to facilitate the localized etching of cavities in bodies formed of electrical conductors.

Other objects are to eliminate the need for mechanical abrading of bodies in shaping them, to produce bodies of desired thickness, to enable depressions having flat bottoms to be etched in conductor bodies, and to simplify the apparatus required for localized etching of conductor bodies.

One feature of this invention resides in immersing a portion of the surface of a body of electrically conductive material in an electrolyte in which a resulting compound of the body material is soluble, and establishing a localized galvanic couple on the portion of the body wherein localized etching is sought by contacting the body surface on that portion with an element of a material more noble than the body material. Localized etching occurs in the immediate vicinity of the contacting element by virtue of the electrochemical reactions incidental to the settting up of an internal cell in the system.

Another feature comprises employing an etching apparatus having the electrode for the galvanic couple incorporated as the sensing element for a means of measuring mechanical displacement and biasing said electrode against the surface being etched so that it continuously engages the bottom of the cavity being etched. Thus, the depth of the cavity is continuously monitored and accurate control thereof is possible. In one embodiment wherein coaxial cavities are to be formed on opposite faces of an element, two electrodes may be employed, one as a mechanical reference point and the other as the sensing element of a measuring means such as a dial gauge which has initially been set to zero with the elements in contact. This latter arrangement enables one to continuously monitor the thickness of the web of material remaining between the feeler elements.

A further feature involves controlling the shape of the surface of the cavity, particularly at its bottom, by the proper choice of etching conditions and electrode form. A plane bottom surface can be formed by employing an electrode having a convex domed tip in engagement with the surface of the specimen being shaped.

Other features resides in facilitating the etching action by employing electrolytes which chemically attack the body in the absence of a galvanic couple, preferentially etching a portion of a specimen surface which is immersed in an electrolyte which attacks the material of the specimen without the use of a masking means, employing electrode materials which do not react with the electrolyte and do not polarize to such an extent that galvanic action is blocked to any substantial degree, incorporating depolarizers in the electrolyte to accelerate the etching action, and utilizing an oxidizing agent in the electrolyte to avoid hydrogen evolution at the cathode of the galvanic couple.

The above and other objects and features of this invention will be more fully appreciated from the following detailed description when read with reference to the accompanying drawing in which.

Figure 1:
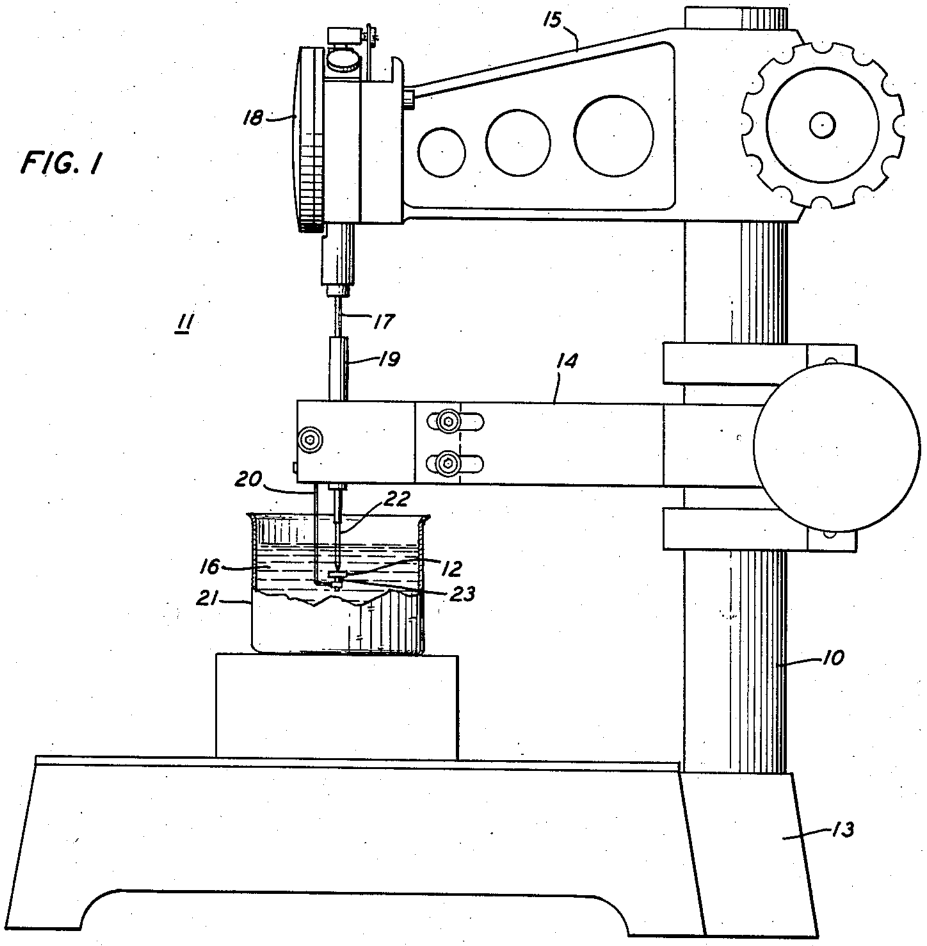
Fig. 1 is an elevation of one form of apparatus for performing the localized etching techniques of this invention.

Referring now to the drawing, Fig. 1 shows an etching fixture 11 for the production of cavities in the surface of a specimen 12 by localized or preferential etching. This fixture comprises a base 13 supporting a standard 10 upon which are supported a pair of brackets 14 and 15 adjustably secured thereto. Bracket 15 carries a means for measuring mechanical displacement of a plunger 17 such as a dial gauge 18. Bracket 14 supports a bearing tube 19 in which plunger 17 is axially slidable, and a fixed support arm 20 for the specimen 12. The support arm 20 depends from bracket 14 and extends into a tank 21 containing a suitable electrolyte 16 for performing the localized etching of this invention. An electrode 22 of a form and a material having characteristics to be discussed below is fitted into a socket on the end of plunger 17 so that it is mechanically biased against the specimen surface and toward the body support position by a biasing means (not shown) incorporated in gauge 18 through the mechanical coupling of plunger 17.

Figure 4:
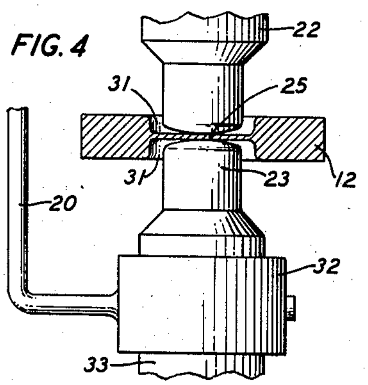

The details of one form of specimen support head are shown on an enlarged scale in Fig. 4. This support head is arranged for the production of coaxial cavities 31 on opposite faces of the wafer shaped specimen 12. It comprises support arm 20 terminated in clamp 32 which embraces and sustains a shaft portion 33 of a fixed specimen support 23. The specimen is maintained between the aligned specimen support 23 and the electrode 22 by the mechanical bias within the measuring means 18 which urges the electrode toward support member 23. In the embodiment of Fig. 4 support member 23 is of the same form as electrode 22 and functions as electrode 22 in forming a cavity 31 in the under surface of the specimen. However, where only a single cavity is desired, the support member 23 may be of a material and form which causes no reaction on the lower surface of the specimen and functions only to maintain that lower surface in a fixed location which provides a reference plane or point for measuring the displacement of the sensing element constituted by the face of electrode 22.

In any form of the etching process the electrode 22 and the support 23 is advantageously of a material which is not attacked by the electrolyte. When a single dimple is to be produced as shown in Fig. 3 the support 23 should also be of a material which is nonconductive so that no galvanic couple is established between it and the semiconductor. The electrode 22 and the corresponding unitary support and electrode 23 in the double cavity etching processes of Figs. 2 and 4, must be of a conductive material to establish galvanic couples with the specimen and to induce localized etching thereof. Further, the electrode material should be cathodic with respect to the specimen and therefore below the material of the specimen in the electromotive series, i. e., more noble than the specimen material, the electrode material should not react with the electrolyte, and it should not polarize to a degree that galvanic action is blocked. When the above conditions prevail, a concentrated localized galvanic couple exists and induces an accelerated etching in its vicinity. The character of the electrolyte should be such that the product of the electrochemical reaction at the specimen-electrolyte interface is soluble therein.

In operation the measuring means is set at zero while the face of electrode 22 is coincident with the plane of support of specimen support 23, thereby establishing the upper limit of support 23 as the reference position for the gauge in determining the thickness of the web 25 of the specimen 12 which remains as etching proceeds. The electrode 22 and support 23 are then separated and the specimen placed between them where it is sustained by the force of the mechanical bias of gauge 18. Etching action is initiated by immersing the mechanically connected specimen 12 and electrode 22 in the region of contact in a suitable electrolyte 16, for example by immersion of the entire specimen in a tank 21 containing the electrolyte, by flowing a stream of the electrolyte over the region of contact, or by applying a drop of the electrolyte to that region. The etching action is allowed to continue until the dial gauge indicates that the desired final thickness remains in the web under the electrode at which time the action is halted as by the removal of the electrolyte and the rinsing away of any residue thereof. The electrode 22 and support 23 are then separated and the specimen is removed from the fixture 11 and dried. It is then ready for further device fabrication.

The mechanism of localized etching in accordance with this invention resides in the establishing of a cell having an internal electromotive force sufficient for practical etching in the combination of the specimen and contacting electrode all immersed in the electrolyte. The specimen is of a more basic material than the electrode and therefore is anodic with respect to the electrode. The resulting battery is short-circuited through the contact between the specimen and electrode so that current flows through that contact and the electrolyte. Current flow through the electrolyte is concentrated near the point of contact of the couple since the conductance of the paths in those regions is greater than the conductance of the longer paths spaced therefrom. Distribution of the electrochemical reactions at the anode and cathode occurs in accordance with the ionic current flow in the electrolyte. The reaction at the anode is the oxidation of the material and then the resulting oxide enters the electrolytic solution while electrons from the anode flow through the physical contact to the cathode and liberate hydrogen into the electrolyte at the cathode-electrolyte interface.

Cavities have been produced in n- and p-type semiconductive bodies of germanium and silicon with a plattinum electrode 22 while employing electrolytes comprising glacial acetic acid, concentrated nitric acid, 48 percent hydrofluoric acid, and water. These electrolytes are also chemical etchants for germanium and silicon, hence the process when practiced with these electrolytes results in a differential or preferential etching wherein the material adjacent the galvanic couple is etched at a greater rate than that subjected to the chemical etching action alone. An enhancement of the rate of electrolytic etching with respect to the chemical etching is realized by reducing the temperature of the etching bath. This enhancement is largely attributable to a reduction in the rate of chemical etching at reduced temperatures.

Since the rate of the electrochemical reaction is dependent upon the current flowing through the couple and this in turn is dependent upon the effective electromotive force of the couple and the resistance of the current paths, a number of factors are available for adjusting the etching rate. The electromotive force of the couple is determined by the position of the cathode material with respect to the anode material, the specimen, in the electromotive force series. Thus, the greater the difference in potential of these materials the greater the electromotive force of the couple. Under some conditions an electromotive force opposing that of the couple is develped at the cathode incidental to the evolution of hydrogen at its interface with the electrolyte, this is termed the hydrogen overvoltage of the cathode. Hydrogen overvoltages can be controlled by a suitable choice of cathode material or by the incorporation of some oxidizing agent in the electrolyte which combines with the hydrogen to produce water, thereby depolarizing the cathode. Hydrogen peroxide or bromine is a suitable oxidizing agent for cathodic depolarization. Another means of increasing the rate of dissolution is to depolarize the anode by making the electrochemical reaction product more soluble in the electrolyte and by removing the reaction products from the vicinity of the specimen. Depolarization can also be effected by agitation of the electrolyte whereby the reaction products are swept away from the electrodes.

Figure 2:
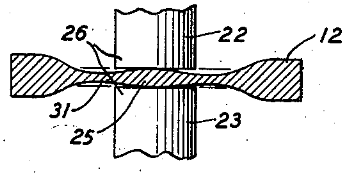
Fig. 2 is an enlarged view of a body in which cavities have been etched in accordance with this invention with the specimen sectioned through the center of the cavities therein.
Figure 3:
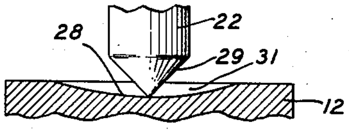
Figs. 3 and 4 are enlarged sectional elevations of specimens and their electrodes illustrating electrode forms suitable for producing regular convex and plane bottoms in the etched cavities.

One electrode form and the cavities resulting therefrom are shown in Fig. 2. The electrode 22 and support member 23 are composed of platinum and have right circular cylindrical forms of 0.050 inch diameter with plane faces 26 normal to their axes. The specimen 12 is of one ohm-centimeter n-type silicon and has an original thickness of 0.018 inch. The electrode 22, support member 23, and specimen 12 while in contact were immersed in an electrolyte consisting of three parts by volume of glacial acetic acid, three parts by volume of 48 percent hydrofluoric acid, and five parts by volume of nitric acid (1.42 specific gravity) for two minutes while at a temperature of 20° C. and then rinsed in water to produce the cavities shown. About 0.012 inch of material remained over the major portions of the wafer after this treatment while the web 25 is about 0.008 inch thick at its center and 0.005 inch thick at its thinnest point, approximately under the prepihery of faces 26. The dimples are of circular form and extend about 0.003 inch beyond the electrodes 22 and 23.

A convex cavity 28 having its maximum depth at its cross-sectional center is produced in specimen 12 by employing a right circular cone as an electrode tip 29 as shown in Fig. 3. The materials employed in producing the disclosed cavity are the same as those employed in the above example.

Fig. 4 shows a form of electrode face which produces a flat bottomed cavity 31 suitable for semiconductive devices wherein closely spaced parallel plane n-p junctions are to be formed by diffusion of acceptor or donor materials into the semiconductor. The configuration disclosed was formed in an n-type single crystal silicon wafer originally 0.030 inch thick and of about 0.5 ohm-centimeter resistivity. Steep walled cavities having a diameter of .057 inch and a web between their bottoms 0.0008 inch thick are formed in a bath of the electrolyte described above at about 20° C. by immersion for seven minutes and 15 seconds. A similar pair of cavities was produced in a p-type silicon wafer of two ohm-centimeters resistivity by a four minute and 45 second immersion in the electrolyte. The web in this latter instance was about 0.006 inch thick. The electrode form employed to realize the flat bottomed cavities was a 0.050 inch platinum wire having a face which is an element of the surface of a sphere of 0.075 inch radius.

The shape of the cavities formed by the method of this invention depends upon the shape and position of the cathode of the galvanic couple. The circular cavities discussed above were all formed with the axis of the cylindrical cathode normal to the plane of the surface being etched. An elongated cavity will form under the acute angle which exists when the cathode is other than normal to the specimen surface. Cavities in the forms of troughs can be formed with a cathode making a line contact with the specimen. As in the case of the pointed cathode shown in Fig. 3, the use of a line contact cathode having a sharp edge will produce a trough having its maximum depth at the center of its cross section.

While the preceding description has been directed principally to silicon specimens and an electrolyte of nitric, acetic, and hydrofluoric acids, it is to be understood that the invention is applicable to other specimen materials, particularly germanium, other cathode materials, and other electrolytes. The specimen materials must conduct electricity, they must be above the cathode materials in the electromotive series, and their electrochemical reaction products must be soluble in the electrolyte. It is not necessary that the electrolyte be of a composition which will attack the specimen in the absence of the galvanic couple set up in the practice of this invention. Thus, for example, while germanium and silicon can be preferentially etched by setting up a galvanic couple therewith in electrolytes which attack these materials even without such a couple such as the above-described composition, variations in concentration from that composition, other corrosive electrolytes such as combinations of nitric and hydrofluoric acids or sodium hydroxide and hydrogen peroxide, and electrolytes which are normally noncorrosive to the material of the specimen can be employed to effect a localized etching in the vicinity of the couple.

It is to be understood that the above-described processes and apparatus are illustrative of the application of the principles of this invention. Numerous other combinations of processing steps and apparatus may be devised by those skilled in the art without departing from the spirit and scope of the invention.

What is claimed is:

1. The method of producing a localized cavity of a prescribed peripheral configuration in a semiconductive body which comprises mounting an electrode of a material more noble than said body material against the surface of the body coincident with the desired location of the cavity, said electrode having a configuration parallel to and adjacent said body surface corresponding to that of said cavity periphery and furthermore having a shape such that the maximum area of said surface initially contacted by said electrode is equivalent to the area of a circle 50 mils in diameter, applying pressure to said electrode in a direction normal to said surface thereby maintaining said electrode in contact with said surface, and immersing the surface and electrode in the vicinity of and including the regions of contact between the electrode and the body in an electrolyte in which the product of the electrochemical reaction at the body-electrolyte interface is soluble to form a galvanic couple.

2. The method of producing a localized cavity of a prescribed peripheral configuration in a semiconductive body which comprises mounting an electrode of a material more noble than said body material against the surface of the body coincident with the desired location of the cavity, said electrode having a configuration parallel to and adjacent said body surface corresponding to that of said cavity periphery and furthermore having a shape such that the maximum area of said surface initially contacted by said electrode is equivalent to the area of a circle 50 mils in diameter, applying pressure to said electrode in a direction normal to said surface thereby maintaining said electrode in contact with said surface, and immersing the surface and electrode in the vicinity of and including the regions of contact between the electrode and the body to form a galvanic couple in a chemical etchant which attacks the body material in the absence of the galvanic couple.

3. The method of producing a localized cavity of a prescribed peripheral configuration in a semiconductive body which comprises mounting a platinum electrode against the surface of the body coincident with the desired location of the cavity, said electrode having a configuration parallel to and adjacent said body surface corresponding to that of said cavity periphery and furthermore having a shape such that the maximum area of said surface initially contacted by said electrode is equivalent to the area of a circle 50 mils in diameter, applying pressure to said electrode in a direction normal to said surface thereby maintaining said electrode in contact with said surface, and immersing the surface and electrode in the vicinity of and including the regions of contact between the electrode and the body in an etchant comprising nitric acid, acetic acid, and hydrofluoric acid to form a galvanic couple.

4. The method in accordance with claim 3 wherein the semiconductive body is of silicon.

5. The method in accordance with claim 3 wherein the semiconductive body is of germanium.

6. The method of producing a localized cavity of a prescribed peripheral configuration having a substantially plane bottom in a semiconductive body which comprises mounting an electrode of a material more noble than said body material against the surface of the body coincident with the desired location of said cavity, said electrode having a convex tip and a configuration parallel to and adjacent said body surface corresponding to that of said cavity periphery and furthermore having a shape such that the maximum area of said surface initially contacted by said electrode is equivalent to the area of a circle 50 mils in diameter, applying pressure to said electrode in a direction normal to said surface thereby maintaining said electrode in contact with said surface, and immersing the surface and electrode in the vicinity of and including the regions of contact between the electrode and the surface in an electrolyte in which the product of the electrochemical reaction at the body-electrolyte interface is soluble to form a galvanic couple.

7. The method of producing a localized cavity of a prescribed peripheral configuration in a semiconductive body which comprises mounting an electrode of a material more noble than said body material against the surface of the body coincident with the desired location of the cavity, said electrode having a configuration parallel to and adjacent said body surface corresponding to that of said cavity periphery and furthermore having a shape such that the maximum area of said surface initially contacted by said electrode is equivalent to the area of a circle 50 mils in diameter, applying pressure to said electrode in a direction normal to said surface thereby maintaining said electrode in contact with said surface, immersing the surface and electrode in the vicinity of and including the region of contact therebetween in an electrolyte in which the product of the electrochemical reaction at the body-electrolyte interface is soluble, gauging continuously the depth of said localized cavity, and terminating the reaction at the galvanic couple between the body and electrode when said localized cavity is of the desired depth.

8. The method of producing a localized cavity of a prescribed peripheral configuration having a substantantially plane bottom in a semiconductive body which comprises mounting an electrode of a material more noble than said body material against the surface of the body coincident with the desired location of said cavity, said electrode having a convex tip and a configuration parallel to and adjacent said body surface corresponding to that of said cavity periphery and furthermore having a shape such that the maximum area of said surface initially contacted by said electrode is equivalent to the area of a circle 50 mils in diameter, applying pressure to said electrode in a direction normal to said surface thereby maintaining said electrode in contact with said surface, immersing the surface and electrode in the vicinity of and including the regions of contact between the electrode and the surface in an electrolyte in which the product of the electrochemical reaction at the body-electrolyte interface is soluble to form a galvanic couple, gauging continuously the depth of said localized cavity, and terminating the reaction at the galvanic couple when said localized cavity is of the desired depth.

9. The method of producing a localized cavity having a prescribed peripheral configuration and a maximum depth at its cross-sectional center in a semiconductive body which comprises mounting a sharpened portion of an electrode of a material more noble than said body material against the surface of the body coincident with the desired location of the center of the cavity, said electrode having a configuration parallel to and adjacent said body surface corresponding to that of said cavity periphery and furthermore having a shape such that the maximum area of said surface initially contacted by said electrode is equivalent to the area of a circle 50 mils in diameter, applying pressure to said electrode in a direction normal to said surface thereby maintaining said electrode in contact with said surface, and immersing the surface and electrode in the vicinity of and including the region of contact therebetween in an electrolyte in which the product of the electrochemical reaction at the body-electrolyte interface is soluble.

10. The method of producing a localized reduced section of a prescribed peripheral configuration and thickness in a semiconductive body which comprises immersing the surface of the body including the portion to be reduced in an electrolyte in which the electrochemical oxidation products of the body material are soluble, mounting a reference element against a surface of said body opposite the portion to be reduced to define a reference plane, mounting an electrode of a material more noble than the semiconductor against the immersed surface and coincident with the portion to be reduced to form a galvanic couple therewith, said electrode having a configuration parallel to and adjacent said body surface corresponding to the periphery of said reduced section and furthermore having a shape such that the maximum area of said surface initially contacted by said electrode is equivalent to the area of a circle 50 mils in diameter, applying pressure to said electrode in a direction normal to said surface thereby maintaining said electrode in contact with said surface, and interrupting the electrochemical oxidation of the body on the immersed surface in the vicinity of the galvanic couple when the electrode and reference plane are separated by the prescribed thickness.

11. The method of producing coaxial localized cavities of prescribed peripheral configurations in opposing surfaces of a semiconductive body by an internally powered localized electrochemical oxidation of the body material which comprises mounting a pair of electrodes of materials more noble than said body material against opposing surfaces of the body coincident with the desired locations of the cavities, said electrodes having configurations parallel to and adjacent said opposing surfaces corresponding to the peripheries of said cavities and furthermore having shapes such that the maximum area of surface initially contacted by each electrode is equivalent to the area of a circle 50 mils in diameter, applying pressure to said electrodes in a direction normal to said surfaces thereby maintaining said electrodes in contact with said surfaces, and immersing the surfaces and electrodes including the regions in the vicinity of the respective areas of contact in an electrolyte in which the electrochemical oxidation product of the body material is soluble.

12. The method of producing a localized cavity having a circular periphery in a semiconductive body which comprises mounting an electrode having a right circular cylindrical portion against the surface of the body with the axis of said cylindrical portion normal thereto and coincident with the center of said circular periphery, the maximum area of said surface initially contacted by said electrode being equal to the area of a circle 50 mils in diameter, applying pressure to said electrode in a direction normal to said surface to maintain said electrode in contact with said surface, said electrode being of a material more noble than said body material, and immersing the surface and electrode in the vicinity of and including the regions of contact between the electrode and the body in an electrolyte in which the product of the electrochemical reaction at the body-electrolyte interface is soluble to form a galvanic couple.

13. The method in accordance with claim 12 wherein the end of the right circular cylindrical portion of said electrode is provided with a protuberant tip which is mounted in contact with said surface of said body.

References Cited in the file of this patent

UNITED STATES PATENTS

| | | |
|---|---|---|
| 2,052,962 | Booe | Sept. 1, 1936 |

FOREIGN PATENTS

| | | |
|---|---|---|
| 231,075 | Switzerland | May 16, 1944 |
| 335,003 | Great Britain | Sept. 18, 1930 |